United States Patent [19]

Kihara et al.

[11] Patent Number: 5,133,158
[45] Date of Patent: Jul. 28, 1992

[54] CONTROL SYSTEM OF GRINDING MACHINE

[75] Inventors: Hiroyuki Kihara; Hideki Omori, both of Narashino, Japan

[73] Assignee: Seiko Seiki Kabushiki Kaisha, Japan

[21] Appl. No.: 606,539

[22] Filed: Oct. 31, 1990

Related U.S. Application Data

[62] Division of Ser. No. 416,842, Oct. 4, 1989, Pat. No. 5,024,025.

[30] Foreign Application Priority Data

Oct. 4, 1988 [JP] Japan ............................ 63-130099[U]
Oct. 14, 1988 [JP] Japan ............................ 63-134236[U]
Oct. 14, 1989 [JP] Japan ............................ 63-259004

[51] Int. Cl.⁵ ............................................ B24B 53/04
[52] U.S. Cl. ............................ 51/165.77; 51/165.87; 125/11.18; 125/11.21; 125/11.02
[58] Field of Search ............... 51/5 D, 165.77, 165.76, 51/165.8, 165.93, 325; 125/11.18, 11.21, 11.02

[56] References Cited

U.S. PATENT DOCUMENTS

| 3,209,494 | 10/1965 | Seidel | 51/103 R |
| 4,085,554 | 4/1978 | Sugita | 125/11.21 |
| 4,180,946 | 1/1980 | Heijkenskjold et al. | 51/134.5 R |
| 4,956,945 | 9/1990 | Ooshima | 51/165.71 |

FOREIGN PATENT DOCUMENTS

| 2313838 | 10/1973 | Fed. Rep. of Germany . | |
| 3416441 | 11/1985 | Fed. Rep. of Germany . | |
| 2103962 | 4/1972 | France . | |
| 0096772 | 6/1982 | Japan | 51/5 D |
| 0191571 | 8/1988 | Japan | 51/165.77 |
| 0795913 | 1/1981 | U.S.S.R. | 51/165.77 |

OTHER PUBLICATIONS

Soviet Inventions Illustrated, Second Mechanical, week 85-17, 9 Jun. 1985, Derwent Publications Ltd., London, GB.

Primary Examiner—Robert A. Rose
Attorney, Agent, or Firm—Bruce L. Adams; Van C. Wilks

[57] ABSTRACT

The control system is provided in a grinding machine composed of an axially movable rotational shaft having a grinding tool and being supported magnetically by electromagnets. The control system includes a target position modifying controller for modifying or shifting a reference target levitating position of the rotational shaft in a retreating direction away from a workpiece reaches a predetermined amount. The control system further includes a rigidity modifying controller operative during quick feed operation of the rotational shaft for making a rigidity of the rotational shaft lower than that in the grinding operation by adjusting exciting currents of the electromagnets. The control system still further includes a dressing controller operative during dressing of a new grinding tool for detecting that the grinding tool begins to touch a dresser and for judging that the dressing is completed just when an arithmetic value calculated based on the detection reaches a predetermined value.

4 Claims, 9 Drawing Sheets

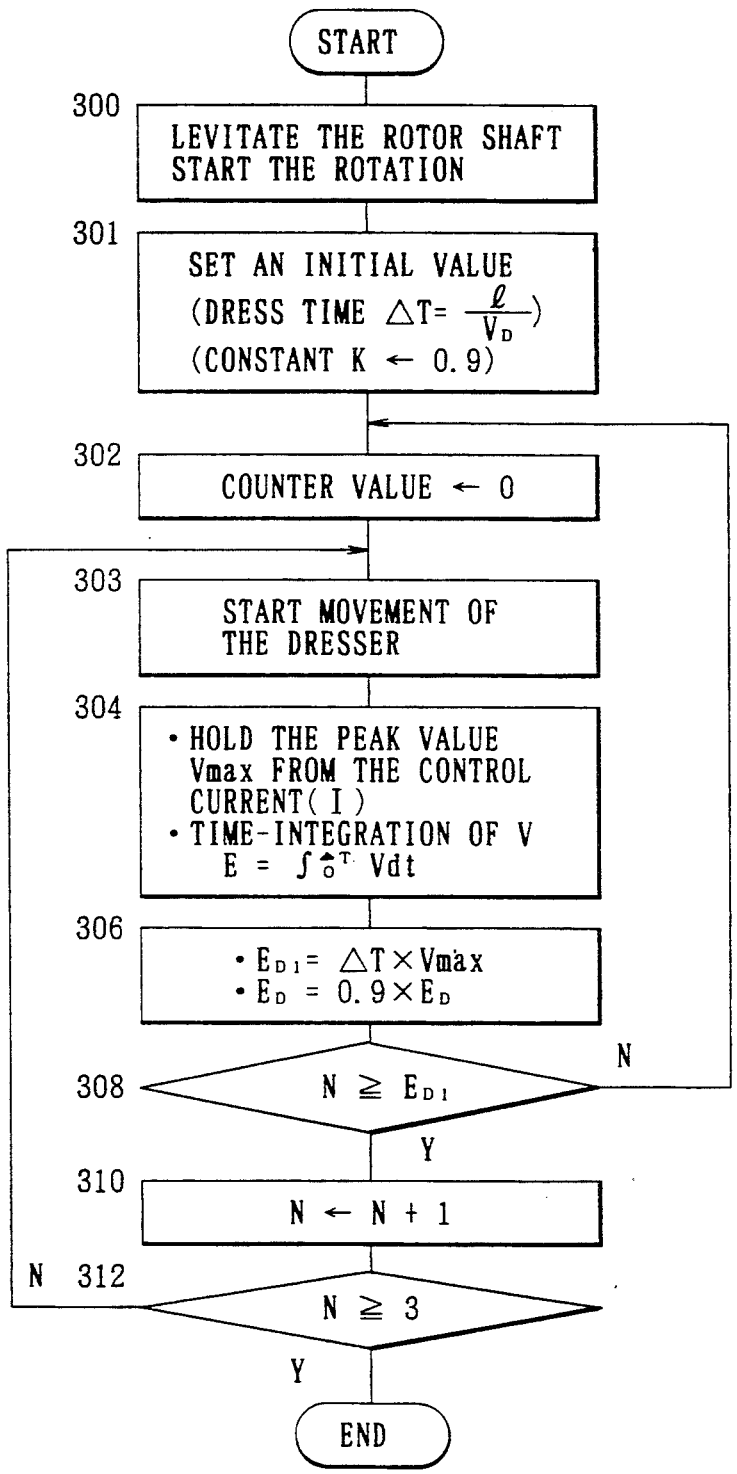

CONTROL SYSTEM OF GRINDING MACHINE

This is a divisional of application Ser. No. 416,842, filed Oct. 4, 1989 now U.S. Pat. No. 5,024,025.

BACKGROUND OF THE INVENTION

The present invention generally relates to a control system of a grinding machine, and more particularly, to an improved control system in which a rotor shaft of a spindle is axially supported on a magnetic bearing.

The present invention further relates to a dressing control system of a grinding stone, and more particularly, to a control system suitable for so-called new wheel dressing on the occasion of replacement of the grinding stone.

In recent years, the accuracy of grind finishing by a grinding machine has increased. With this tendency, a grinding process is effected by rotating the grinding stone at a so-called hypervelocity.

Take an internal grinding machine for instance, the workpiece is ground typically by use of a spindle axially supported on a bearing. More specifically, the workpiece is mounted on a head stock and is then ground to predetermined dimensions by moving the head stock or a grinding stone shaft table or both of them. In this case, a sizing detector serves to detect whether the workpiece is ground to the predetermined dimensions or not. When the amount of variations in the grinding dimensions comes to the predetermined dimensions, the head stock or the grinding stone shaft table is retreated in response to a detection signal of the sizing detector, thereby separating the grinding stone from the workpiece.

There is caused, however, a first drawback that in the case of effecting a grinding process by the prior art system, the grinding stone is moved back when dimensional values reach predetermined dimensions, and scatter appears in the finishing dimensions of the ground workpiece or in a taper thereof due to a time-lag of the table movement associated with the retreat of the grinding stone.

In recent years, the accuracy of grind finishing by a grinding machine has increased. With this tendency, a grinding process is effected by rotating the grinding stone at a so-called hypervelocity. A workpiece is ground by employing a spindle axially supported on a magnetic bearing because of the very high speed rotation.

To be specific, the workpiece is mounted on a head stock and then ground in accordance with predetermined dimensions by moving the head stock or a grinding stone shaft table or both of them. At this time, the head stock or the grinding stone shaft table is moved until the grinding stone touches the workpiece, i.e., the movement during a non-load feed is performed quicker than in the grinding process to reduce a grinding period. The contact between the grinding stone and the workpiece is recognized by detecting ultrasonic frequency oscillation, namely, so-called AE (Acoustic Emission) waves which are generated when the contact takes place, or by detection from an increase in load current of the grinding stone spindle due to a grinding resistance.

There arises, however, a second drawback inherent in the prior art system. When effecting the grinding process by use of the prior art system, and if an end point of the quick feed is detected by the AE waves, the detection undergoes disturbances of mechanical oscillations and thereby becomes inaccurate. Where the end point is detected from the increases in load current, the increment in load current is detected after the grinding stone has come into contact with the workpiece, resulting in a problem of causing a decline in grinding accuracy due to a delay of detection.

Furthermore, an impact of impingement of the grinding stone on the workpiece disadvantageously tends to cause a damage to the grinding stone.

Truing and dressing of a rotatively driven grinding stone provided at a top end of a grinding stone shaft of a spindle has heretofore been performed by a dresser equipped with, for example, a diamond tool.

The dressing process is also effected when replacing the grinding stone. The reason for this will be elucidated as follows. The grinding stone (a new wheel) fitted to the rotor shaft rotates with eccentricity, and a so-called deflection takes place. It is therefore required that the deflection be eliminated to arrange the configuration. A total dressing undercut quantity at that time is controlled to perform a predetermined amount of dressing undercut by moving the dresser or the spindle or both of them so as not to cause a shortage of dress.

In recent years, it has been practiced with a higher accuracy of grinding that the grinding stone is ground by rotating it at a so-called hypervelocity. For this reason, a magnetic bearing type spindle becomes dominant in use, wherein a rotor shaft of a spindle is axially retained by electromagnets.

This, however, creates the following third drawback incidental to the prior art dressing control system. The conventional system is constructed to uniformly effect new wheel dressing control for obtaining a predetermined dressing undercut quantity, causing at least no shortage of dress. As a result, there exists the drawback in which excessive dressing is effected depending on the grinding stone. In this case, abrasions of the dresser become more intense than expected due to excessive dressing, or a dressing time increases.

SUMMARY OF THE INVENTION

A first object of the present invention is to effect instant retreat of the grinding stone from a workpiece when the grinding is finished.

A second object of the present invention is to effect soft contact of the grinding stone with a workpiece during the quick feeding process of the grinding stone. A third object of the present invention is to effect efficient dressing of a new grinding stone. According to a first aspect of the present invention, the control system of a grinding machine comprises:

- a spindle having a rotor shaft provided with a grinding stone, the rotor shaft being rotatively driven while being held afloat by magnetic forces of electromagnets;
- a head stock for supporting a workpiece;
- an undercut table for adjusting an amount of variations in grinding dimensions by moving the spindle or the head stock or both of them;
- a sizing detector for measuring an amount of variations in workpiece dimensions; and
- a control means for controlling the rotor shaft so that the rotor shaft is held afloat in a reference target position by adjusting exciting currents of the electromagnets and for controlling a movement of the undercut table which is moved back in such a direction that the grinding stone separates from the workpiece when detecting that dimensional values of the workpiece reach predetermined values from a detection output of the sizing detector, the control means including a target position modifying means for modifying a reference target levitating position of the rotor shaft in a retreating direction of the undercut table when detecting that the workpiece dimensional values reach the predetermined values.

In accordance with the first aspect of the present invention, when the workpiece is ground to the predetermined dimensions, the target levitating position of the rotor shaft is shifted to a position in such a direction that the grinding stone moves away from the workpiece, and the exciting currents of the electromagnets are controlled so that the rotor shaft is held afloat in the thus shifted target levitating position.

According to a second aspect of the present invention, the control system of a grinding machine comprises:

a spindle having a rotor shaft provided with a grinding stone, the rotor shaft being rotatively driven while being held afloat by magnetic forces of electromagnets;

position sensors for detecting a levitating position of the rotor shaft;

a head stock for supporting a workpiece;

an undercut table for adjusting an amount of undercut of grinding by moving the head stock; and control means for controlling a state in which the rotor shaft is held afloat in a target position by adjusting exciting currents of the electromagnets on the basis of detection signals of the position sensors and for controlling a movement of the undercut table which is in turn fed quickly until the grinding stone contacts the workpiece when starting a grinding process, the control means including a rigidity modifying means for making a rigidity of the rotor shaft lower than that in the grinding process by adjusting the exciting currents of the electromagnets during the quick feed.

In accordance with the second aspect of the present invention, the rigidity modifying means adjusts the exciting currents of the electromagnets until the grinding stone touches the workpiece during the quick feed, whereby the rigidity of the rotor shaft is changed lower than that in the grinding process.

According to a third aspect of the present invention, the dressing control system operates for dressing a grinding stone by a predetermined quantity while causing the grinding stone to gradually approach a dresser, and comprises:

a spindle having a rotor shaft provided at its top end with the grinding stone to be dressed, the rotor shaft being rotatively driven while being-held afloat by magnetic forces of electromagnets;

a dresser for dressing the grinding stone;

a moving mechanism for moving the spindle or the dresser or both of them; and control means for controlling the rotor shaft so that the rotor shaft is held afloat in a target position by adjusting exciting currents of the electromagnets and for controlling a dress feeding velocity as well as a dress undercut quantity by moving the moving mechanism, the control means including a dressing controller for detecting that the grinding stone begins to touch the dresser on account of the movement of the moving mechanism from variations in voltages proportional to the exciting currents of the electromagnets and also judging that a new wheel dress completion is made just when an arithmetic value calculated from a value of the detection reaches a predetermined value.

In accordance with the third aspect of the present invention, a contact state between the grinding stone and the dresser is detected from an arithmetic value calculated on the basis of the variations in voltage proportional to the exciting currents (control currents) of the electromagnets. The new wheel dress completion is decisively made just when the arithmetic value reaches a predetermined value.

BRIEF DESCRIPTION OF THE DRAWINGS

FIG. 9 is a flowchart showing control operations of the third embodiment.

DETAILED DESCRIPTION OF EMBODIMENTS

Illustrative embodiments of the invention will hereinafter be described with reference to the accompanying drawings.

Figure 1:
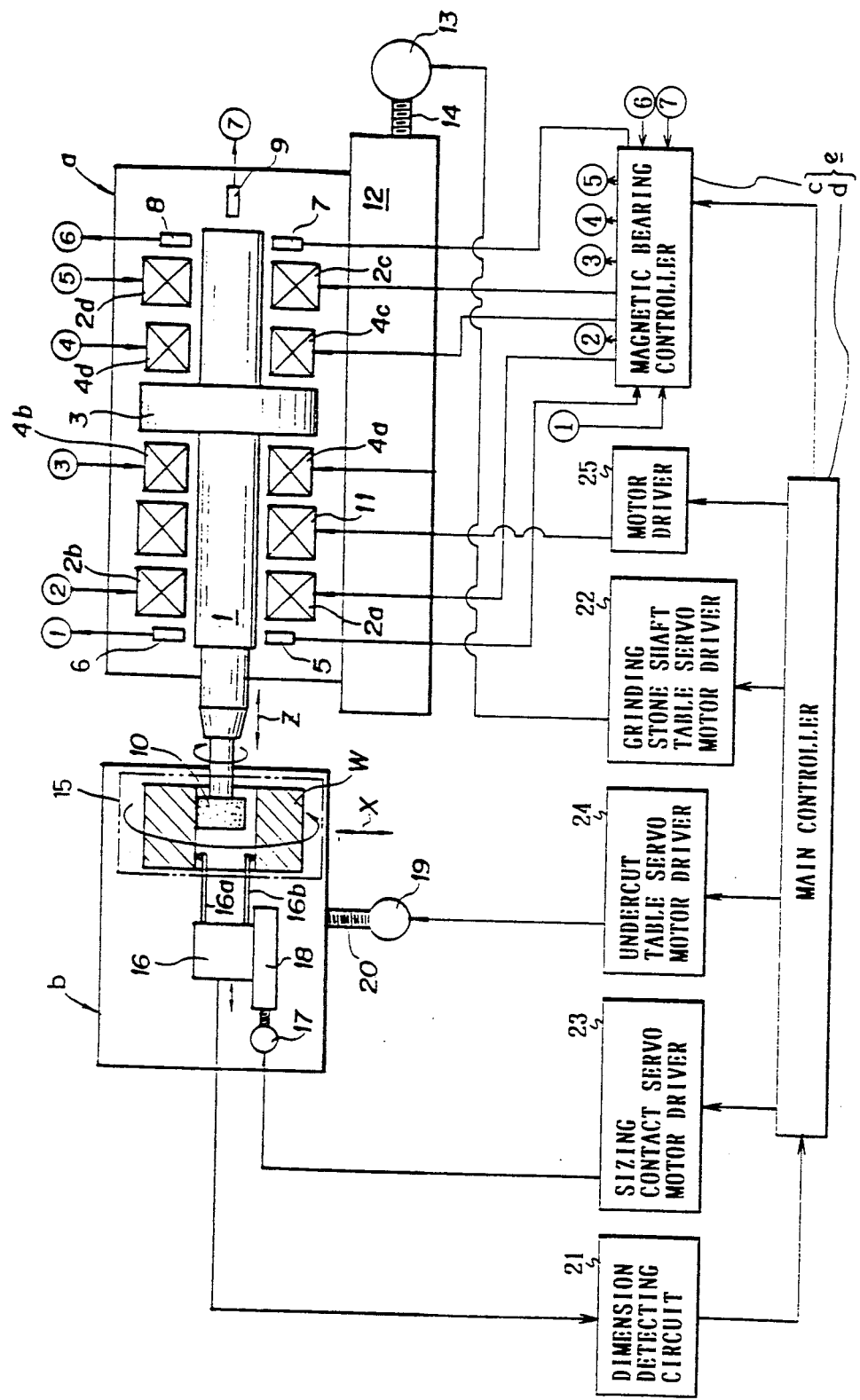
FIG. 1 is a schematic diagram depicting a first embodiment of a control system of the present invention.

FIG. 1 is a schematic block diagram illustrating a first embodiment of a control system of an internal grinding machine according to the present invention. Referring to FIG. 1, the symbol a represents a spindle of an internal grinding machine; b an undercut table mounted with a head stock; c a magnetic bearing controller; and d a main controller. The magnetic bearing controller c and the main controller d are combined to constitute a control means e.

An arrangement of the spindle a is that radial electromagnets 2a, 2b, 2c and 2d are disposed at bilateral ends of a rotor shaft 1 to axially support this rotor shaft in the radial directions; and axial electromagnets 4a, 4b, 4c and 4d are disposed vis-a-vis with each other on both sides of a disk 3 integral with the rotor shaft 1 at its center to axially support the rotor shaft 1 in the axial directions.

A position in which the rotor shaft 1 is levitated by the respective electromagnets is controlled in the following manner. The position of the rotor shaft 1 is detected by radial position sensors 5 to 8 placed at bilateral ends of the rotor shaft 1 and an axial position sensor 9 provided at one end of the rotor shaft 1. Detection signals of these sensors are processed by the magnetic bearing controller c, and the exciting currents of the individual electromagnets are adjusted so that the rotor shaft 1 is held afloat in a reference target position.

For this reason, the magnetic bearing controller c incorporates a bridge circuit, other processing circuits and an electromagnet driver for supplying exciting currents to the respective electromagnets so that the rotor shaft 1 is held afloat in the reference target position. The magnetic bearing controller c further incorporates a target position modifying means for modifying the reference target position on the basis of a command issued from the main controller d.

Designated at 10 in FIG. 1 is a grinding stone provided at the other end of the rotor shaft 1 and rotated with rotation of the rotor shaft 1. More specifically, when a motor 11 disposed substantially at the center of the rotor shaft 1 is supplied with a driving current from a motor driver which will be mentioned later, the rotor shaft 1 rotates, acting as a rotor of the motor, thereby rotating the grinding stone 10.

The undercut table b is provided with a head stock 15 on which a workpiece W is supported. The workpiece W is adapted to rotate similarly to the axial core of the rotor shaft 1.

Designated at 16 is a well-known sizing detector mounted on the undercut table b, the detector 16 being fitted with sizing contacts 16a and 16b each protruded to measure an inside diameter held on the head stock 15 and also being disposed on a constant contact slide table 18 movable in the axial directions of the rotor shaft 1 by means of a serve motor 17 to measure an arbitrary inside diameter position.

The undercut table b is movable in directions (indicated by arrows X in the Figure) orthogonal to the rotor shaft 1 by means of a servo motor 19 and a ball screw 20 rotated by this motor.

The main controller d incorporating a programmable controller is arranged to control the spindle a and the undercut table b in conformity with a stored program. More specifically, the main controller d inputs an output from a dimension detecting circuit 21 for detecting dimensions by processing detection signals transmitted from the sizing detector 16. The main controller d also gives outputs to drivers 22 through 24 for driving servo motors 13, 17 and 19 for moving tables 12, 18 and b and further to a motor driver 25 for rotatively driving the rotor shaft 1.

The magnetic bearing controller c is en bloc controlled by the main controller d. To be specific, the magnetic bearing controller c, as discussed above, controls the exciting currents of the electromagnets 2a-2d and 4a-4d to hold the rotor shaft 1 afloat in the reference target position on the basis of the detection signals of the respective position sensors 5 to 9. Driving of the electromagnets is initiated and halted on the basis of commands issued from the main controller d. Besides, the reference target levitating position of the rotor shaft 1 is varied in accordance with a command given from the main controller d.

Figure 2:
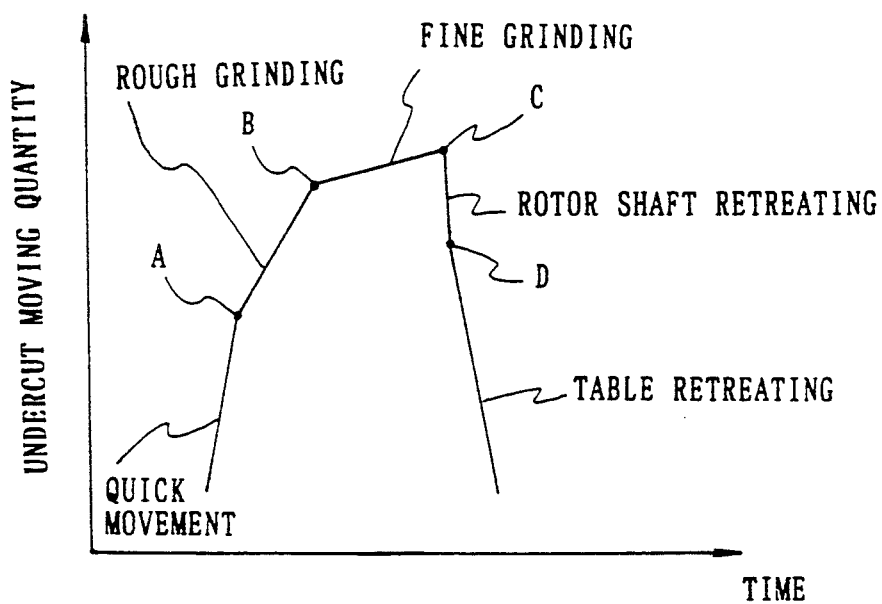
FIG. 2 is a diagram showing an undercut state.
Figure 3:
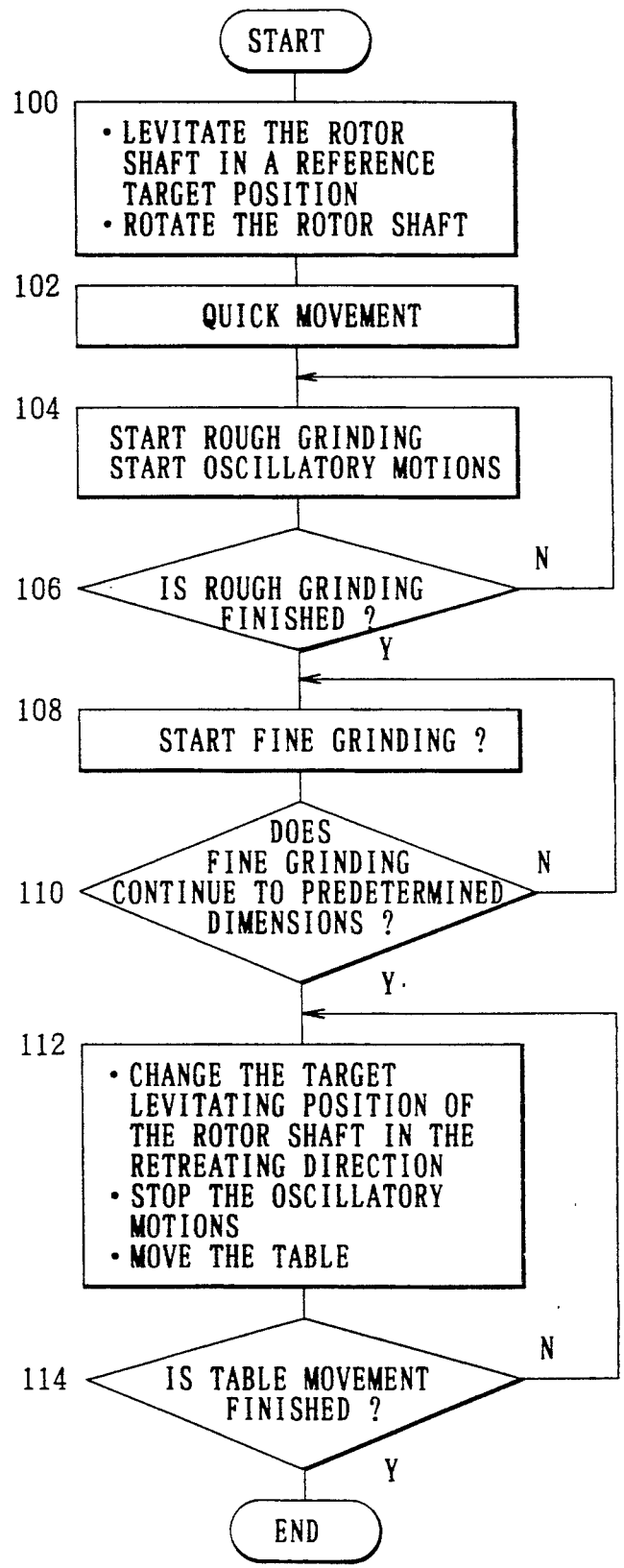
FIG. 3 is a flowchart showing controlling operations of the first embodiment.

The thus arranged first embodiment will be described with reference to FIGS. 2 and 3. FIG. 2 is a diagram depicting a state of undercut, and FIG. 3 is a flowchart showing controlling operations.

When initiating a grinding work by setting the workpiece W on the head stock b, the main controller d issues a magnetic bearing driving command to the magnetic bearing controller c. In consequence of this, the exciting currents are supplied to the electromagnets 2a-2d and 4a-4d, whereby the rotor shaft 1 is held afloat in the predetermined reference target position with a rigidity at the grinding time. At the same time, the motor driver 25 is driven to supply a coil of the motor 11 with an electric current, thereby rotatively driving the rotor shaft 1 (step 100).

Subsequently, driving commands are given from the main controller d to the grinding stone shaft table servo motor driver 22 and the undercut table servo motor driver 24, with the result that the servo motors 13 and 19 rotate at a high velocity to cause the workpiece W and the grinding stone 10 to quickly approach and contact each other (step 102, a point A of FIG. 2). This contact is detected by a sensor (not shown), and a signal thereof is transmitted to the main controller d, thereby stepping the servo motors 13 and 19.

Note that positional variations of the rot-or shaft 1, which are due to the thus detected contact, are detected by position sensors 5-9. Detection signals of these sensors are inputted to the magnetic bearing controller c from which an output may be given to the main controller d.

After the grinding stone has come into contact with the workpiece W, rough grinding is initiated (step 104). At this time, main controller d issues an oscillation command to the spindle table servo motor driver 22, whereby the servo motor is rotated in forward and reversed directions. Subsequently, the table 12 makes reciprocating motions at predetermined strokes in the axial directions of the rotor shaft 1, thus performing oscillatory motions. At the same moment, a rough grinding undercut command is imparted to the undercut table servo motor driver 24, and the servo motor 19 is thereby rotatively driven to move the undercut table b so as to obtain a predetermined amount of dimensional variations (defined by points A and B of FIG. 2). The amount of dimensional variations is detected by a revolving speed detector (not shown) of the servo motor 19; and an amount of movement is calculated on the basis of a detection signal thereof.

Though not illustrated in the flowchart of FIG. 3, the main controller d, if necessary, issues a driving command to a sizing contact servo motor driver 23 to drive a servo motor 17. Then, a sizing contact slide table 18 is moved, thus performing intermittent sizing motions in the known manner.

After finishing the rough grinding process (step 106 Yes), fine grinding is started (step 108). Namely, the main controller gives a fine grinding undercut command to the undercut table servo motor driver 24, thereby decreasing a revolving speed of the servo motor 19. The undercut table b is moved to obtain a predetermined amount of dimensional variations (defined by points B and C of FIG. 2). Note that the amount of dimensional variations is calculated in the same manner as that in rough grinding.

When the workpiece is ground to predetermined dimensions in the fine grinding work, i.e., at the time of completely performing the fine grinding process with the predetermined amount of dimensional variations on the basis of values of measured dimensions at that time by the intermittent sizing operation (step 110 Yes, a point C of FIG. 2), the main controller d issues to the magnetic bearing controller c a target levitating position modifying command to modify the reference target levitating position of the rotor shaft 1 in such a direction that the grinding stone 10 moves away from the workpiece W, namely, in the retreating direction (in which the grinding stone is positioned downwards in FIG. 1). The main controller d also gives a retreat command to the undercut table servo motor driver 24 and an oscillatory motion stop command to the grinding stone shaft table servo motor driver 22 (step 112).

For this reason, the magnetic bearing controller c permits supply of exciting currents equivalent to modifications of the target levitating position to the radial electromagnets 2a-2d, thereby changing the levitating position of the rotor shaft 1. Namely, the grinding stone 10 retreats to separate from the workpiece W with almost no time-lag (e.g., less than 1/10 a time-lag from a step of issuing a retreat command to the undercut table using the servo motor and the ball screw to initiation of retreat).

On the other hand, the undercut table b also starts retreating concurrently with the changing in the levitating position of the rotor shaft 1. In this case however, the retreat is started with some time-lag (a point D of FIG. 2), because it involves rotational driving of the servo motor 19 and of the associated ball screw 20.

The undercut table b retreats at a predetermined stroke, and in the wake of this the grinding stone 10 is separated from the workpiece W. The workpiece W is then demounted from the head stock 10, thus completing the grinding process (step 114 Yes).

In this embodiment, as described above, the target levitating position of the rotor shaft 1 is modified at the time. Finely grinding the workpiece to the predetermined dimensions so that the grinding stone 10 moves back away from the workpiece W simultaneously when starting the retreat of the undercut table b. With this arrangement, it is possible to separate the grinding stone 10 from the workpiece W with almost no time-lag and prevent irregularities and unwanted taper in finishing dimensions of the ground workpiece. Thus, the grinding process can be effected with a high accuracy.

It is to be noted that the table mounted with the head stock is an undercut table in the foregoing embodiment, but a table mounted with a spindle may also be used, or these two types of tables are employed as undercut tables.

The foregoing embodiment has exemplified an internal grinding machine. As a matter of course, however, the present invention can be applied to a surface grinding machine or other grinding machines. In this case, it is obvious that the reference target levitating position of the rotor shaft may be changed in the axial directions.

As discussed above, the present invention exhibits the following effects. The target levitating position of the rotor shaft is changed when finely grinding the workpiece to the predetermined dimensions so that the grinding stone moves back away from the workpiece concurrently with the start of retreat of the undercut table. Therefore, the grinding stone can be separated from the workpiece with almost no time-lag when completing the fine grinding process. It is also feasible to prevent irregularities and unwanted taper in finishing dimensions of the ground workpiece. Thus, the grinding process can be carried out with a high accuracy.

Figure 4:
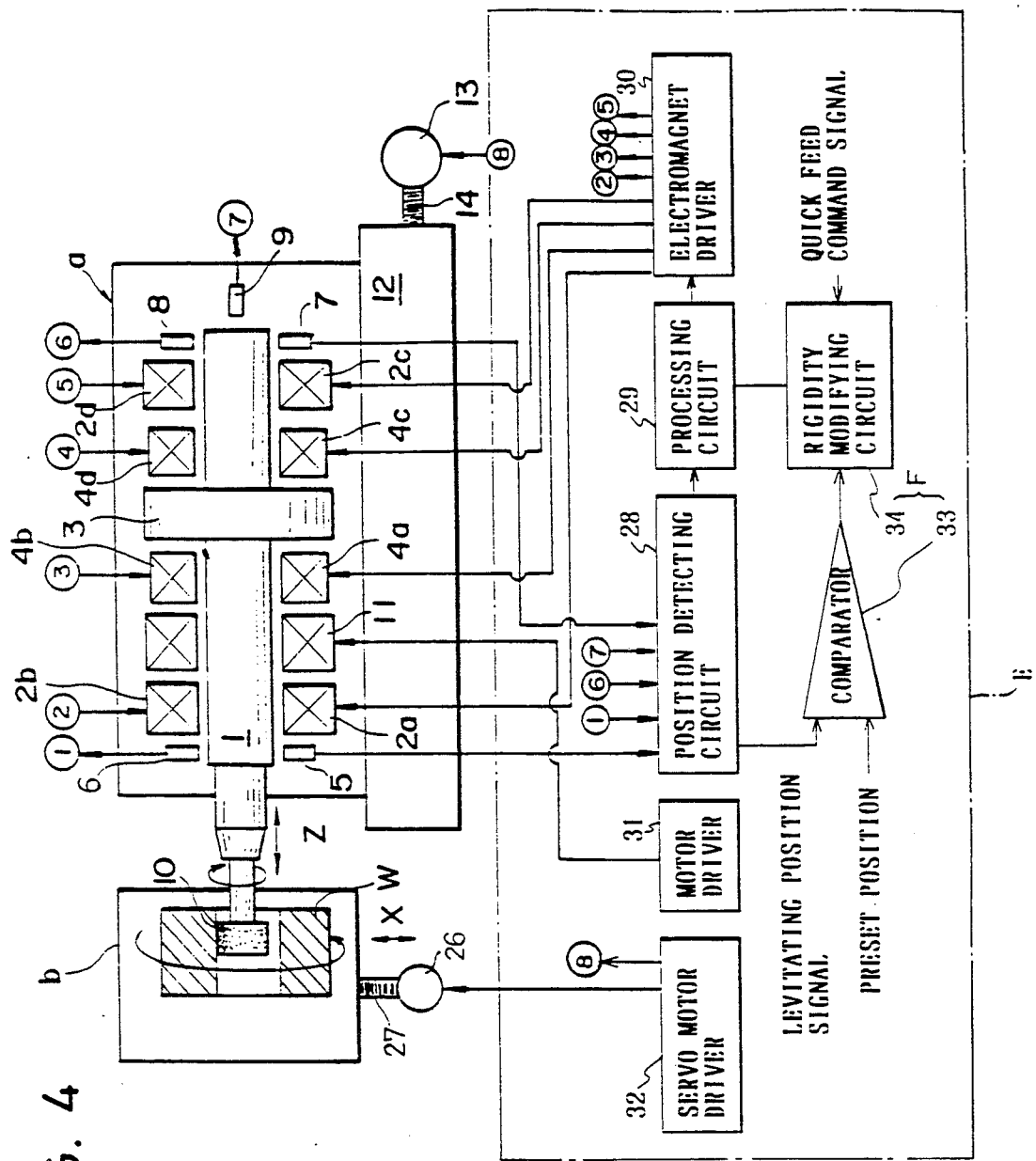
FIG. 4 is a schematic block diagram depicting a second embodiment of a control system of a grinding machine according to the present invention.

FIG. 4 is a schematic block diagram illustrating a second embodiment of a control system of an internal grinding machine according to the present invention. The control system is composed of a spindle a, a head stock b and a control means e.

An arrangement of the spindle a is that radial electromagnets 2a, 2b, 2c and 2d are disposed at bilateral ends of a rotor shaft 1 to axially support this rotor shaft in the radial directions; and axial electromagnets 4a, 4b, 4c and 4d are disposed vis-a-vis with each other on both sides of a disk 3 integral with the rotor shaft 1 at its center to axially support the rotor shaft 1 in the axial directions.

A position in which the rotor shaft 1 is levitated by the respective electromagnets is controlled in the following manner. The position of the rotor shaft 1 is detected by radial position sensors 5 to 8 placed at bilateral end of the rotor shaft 1 and an axial position sensor 9 provided at one end of the rotor shaft 1. Detection signals of these sensors are processed by the control means E, and the exciting currents of the individual electromagnets are adjusted so that the rotor shaft 1 is held afloat in a reference target position.

Designated at 10 in FIG. 1 is a grinding stone provided at the other end of the rotor shaft 1 and rotated with rotation of the rotor shaft 1. More specifically, when a motor 11 disposed substantially at the center of the rotor shaft 1 is supplied with a driving current from the control means e, the rotor shaft 1 rotates, acting as a rotor of the motor, thereby rotating the grinding stone 10.

The spindle a is arranged in such a way that a table 12 mounted with the spindle a is movable in the axial directions (indicated by arrows Z in FIG. 4) by means of a servo motor 13 in combination with a ball screw 14 rotated by this motor.

Held on the head stock b by a work mounting mechanism (not shown) is a workpiece W adapted to rotate similarly with the axial core of the rotor shaft 1. As in the case of the spindle a, the head stock b is movable in directions (indicated by arrows X in the Figure) orthogonal to the axial directions of the rotor shaft by a servo motor 26 and a ball screw 27 rotated by this motor. With this arrangement, an amount of undercut of grinding (grinding quantity) is adjusted by moving the head stock b, thus adjusting dimensions of the workpiece W.

The control means E is comprised of a bridge circuit and other processing circuits, and includes:

- a position detecting circuit 28 for detecting a levitating position of the rotor shaft 1 on receiving of detection signals transmitted from respective position sensors 5-9;
- a processing circuit 29 for adjusting exciting currents of electromagnets 2a-2d and 4a-4d to compensate a difference from a target value by comparing a detection signal sent from the position detecting circuit 28 and a reference target position;
- an electromagnet driver 30 for supplying the exciting currents to the electromagnets 2a-2d and 4a-4d in response to an output signal from the processing circuit 29;
- a motor driver 31 for supplying the exciting current to the motor 11;
- a servo motor driver 32 for driving servo motors 13 and 26 for moving the head stock b and the table 12; and
- a rigidity modifying means f composed of a comparator 25 and a rigidity modifying circuit 26 which are characteristic components of the present invention.

Inputted to the comparator 25 from the position detecting circuit 28 are a levitating position signal associated with the rotor shaft 1 and also a preset position thereof. When a value of the levitating position signal exceeds a preset value, i.e., the levitating position of the rotor shaft 1 deviates (displacement) a predetermined distance from the target position after a grinding stone 10 has touched the workpiece W during the quick feed, the comparator 33 is arranged to transmit a signal to the rigidity modifying circuit 26.

The rigidity modifying circuit 26 has a function to cause a predetermined amount of reduction in a rigidity of the rotor shaft 1 during the grinding process. The rigidity modifying circuit 26 acts to decrease a predetermined amount of exciting currents with which the processing circuit 29 supplies the electromagnets $2a$–$2d$ or $4a$–$4d$.

Figure 5:
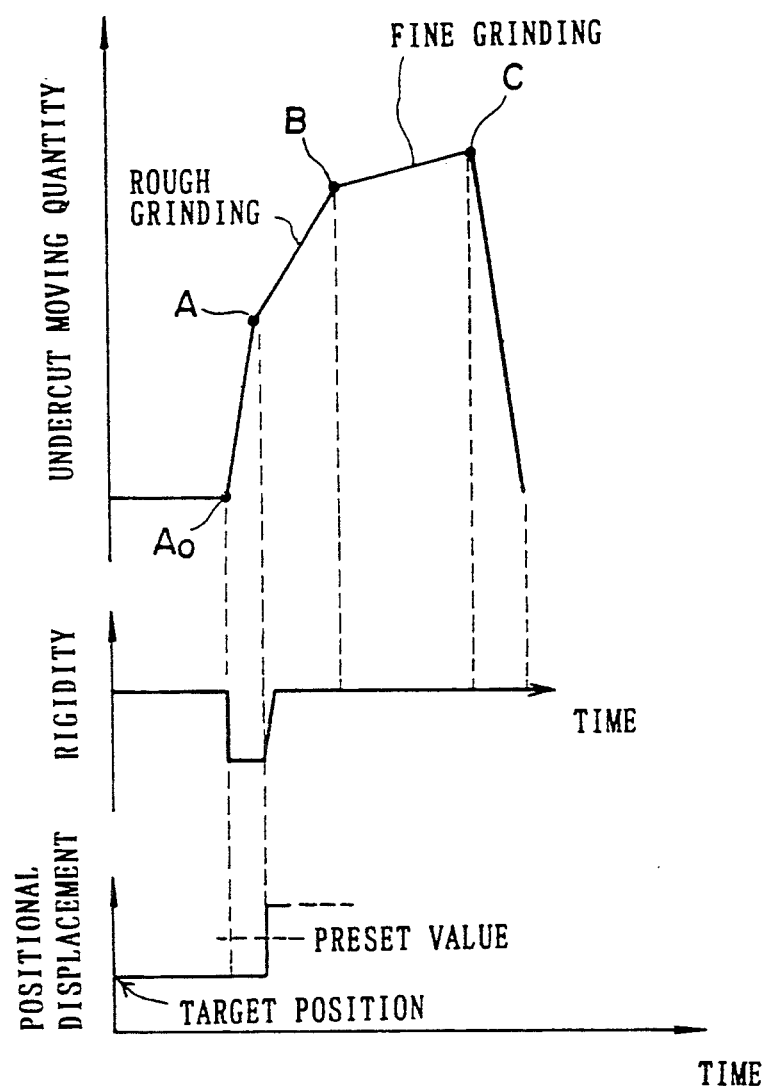
FIG. 5 is a diagram illustrating the undercut state.
Figure 6:
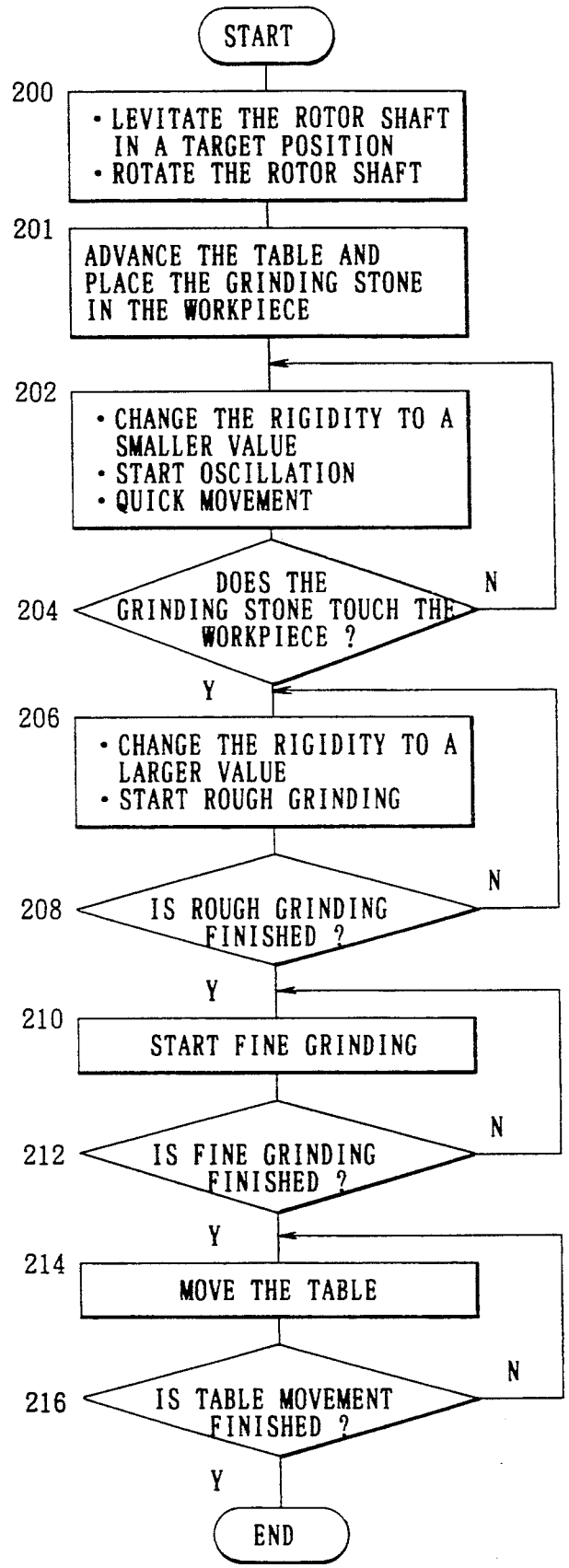
FIG. 6 is a flowchart showing controlling operations of the second embodiment.

The operation of the thus arranged embodiment will be described with reference to FIGS. 5 and 6. FIG. 5 is a diagram depicting a state of undercut, and FIG. 6 is a flowchart showing controlling operations.

When initiating a grinding work by setting the workpiece W on the head stock b, a programmable controller (not shown) (hereinafter abbreviated to a [PC]) issues a magnetic bearing driving command to the control means E. In consequence of this, the exciting currents are supplied to the electromagnets $2a$–$2d$ and $4a$–$4d$, whereby the rotor shaft 1 is held afloat in the predetermined reference target position with a rigidity at the grinding time. At the same time, the motor driver 31 is driven to supply a coil of the motor 11 with an electric current thereby rotatively driving the rotor shaft 1 (step 200).

Subsequently, a driving command is given from the PC to the servo motor driver 34, whereby the servo motor is quickly rotated to move forwards the table till the grinding stone 10 contact the workpiece W (step 201). The PC issues an oscillation command to the servo motor driver 32, and the servo motor 13 is thereby rotated in the forward and reversed directions. Then, the table 12 makes reciprocating motions at predetermined strokes in the axial directions of the rotor shaft 1, thus performing the oscillatory motions.

When the other servo motor 26 is rotated at a high velocity, the workpiece W and the grinding stone 10 quickly approach each other, and at the same moment a quick feed command signal is inputted from the PC to the rigidity modifying circuit 34. Subsequently, the rigidity modifying circuit 34 transmits a rigidity reducing signal to the processing circuit 29, an output of which is given to the electromagnet driver 30 to reduce a predetermined amount of exciting current. Hence, the rotor shaft 1 is held afloat by a rigidity weaker than ever before (step 202, a point $A_0$ in FIG. 5).

The next rough grinding process is started subsequent to a step of detecting the fact that the workpiece W quickly approaches the grinding stone 10 and they come into contact with each other (step 204 Yes), i.e., the step wherein the comparator detects that the grinding stone 10 provided at the top end of the rotor shaft 1 touches the workpiece W so as to change its levitating position and a position signal of the position detecting circuit 28 varies to exceed a preset value with the variations in the levitating position. The rigidity modifying circuit 26 ceases to operate in response to an output signal thereof, and the processing circuit 29 gives an output to the electromagnet driver 30 to restore an original rigidity (step 206).

Regarding the rough grinding process, the PC issues a rough grinding undercut command to the servo motor driver 32, and the head stock b is moved till the workpiece W is processed to predetermined dimensions (defined by points A and B of FIG. 5) after the servo motor 26 has been rotatively driven.

After the rough grinding process has come to an end (step 208 Yes), a fine grinding process is initiated (step 210). To be specific, the PC gives a fine grinding undercut command to the servo motor driver 32, whereby the number of revolutions of the servo motor 26 decreases. Then, the head stock b is moved so that the workpiece W is processed up to predetermined dimensions (defined by points B and C of FIG. 5).

When the workpiece W has been ground to the predetermined dimensions during this fine grinding work (step 212 Yes, a point C of FIG. 5), a retreat command is issued from the PC to the servo motor driver 32, and an oscillatory motion stop command is also given. Immediately, the head stock b is moved, namely, the undercut table retreats (step 214).

After the head stock b has retreated at a predetermined stroke, the grinding stone 10 separates from the workpiece W, and the workpiece W is demounted from the head stock b, thus finishing the grinding process (step 216 Yes).

As described above, in accordance, with this embodiment the rigidity of the rotor shaft 1 is decreased when effecting the quick feed, and at the same time the contact between the workpiece W and the grinding stone 10 is detected from an amount of positional variations of the rotor shaft 1. With this arrangement, it is possible to detect the contact between the workpiece W and the grinding stone 10 without causing any time-lag and also to mitigate the impulses of impingement.

Note that the undercut table is employed as a head stock in the above described embodiment, however, the table 12 mounted with the spindle a may also be adopted, or alternatively these two components may serve as undercut tables.

The foregoing embodiment has exemplified an internal grinding machine. As a matter of course, however, the present invention can be applied to a surface grinding machine or other grinding machines. A reduction in rigidity may be effected in a direction in which the grinding stone contacts the workpiece, e.g., the radial or axial direction alone.

The present invention, as discussed above, exhibits the following effects. The rotor shaft rigidity is decreased during the quick feed, and the contact between the workpiece and the grinding stone is detected from the amount of variations in the levitating position of the rotor shaft. Based on this arrangement, a contact point can be detected with no time-lag, and the impulses of impingement can also be reduced.

Hence, the grinding process is practicable with a high accuracy, preventing damage to the grinding stone.

Figure 7:
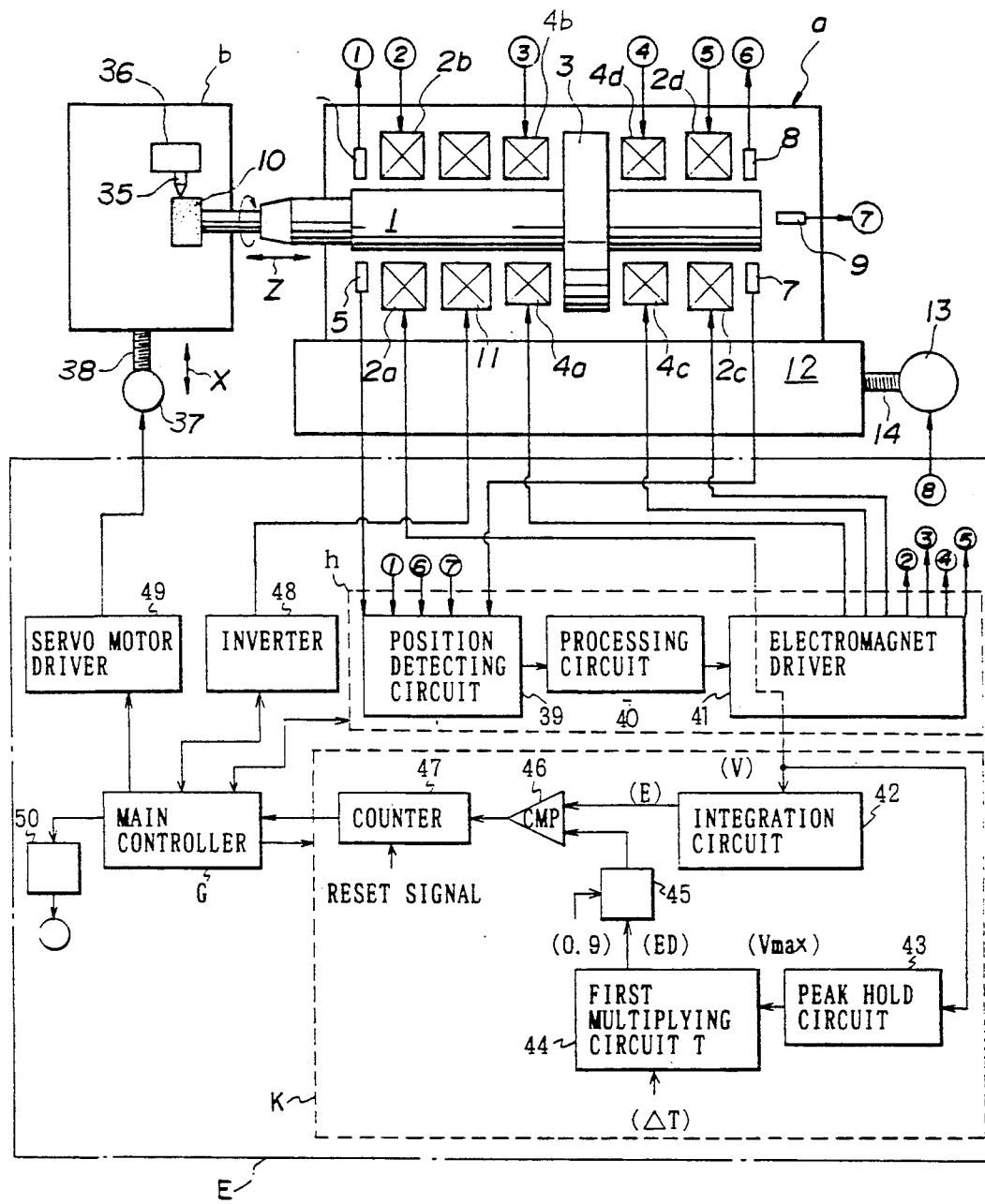
FIG. 7 is a schematic block diagram depicting a third embodiment of a dressing control system of the present invention.

Turning to FIG. 7, there is illustrated a schematic block diagram of a third embodiment of a dressing control system of the grinding machine according to the present invention. The control system is composed of a spindle a, a head stock table b, a grinding stone shaft table 12 and a control means E.

An arrangement of the spindle a is that radial electromagnets $2a$, $2b$, $2c$ and $2d$ are disposed at bilateral ends of a rotor shaft 1 to axially support this rotor shaft in the radial directions; and axial electromagnets $4a$, $4b$, $4c$ and $4d$ are disposed vis-a-vis with the rotor shaft 1 at its center to axially support the rotor shaft 1 in the axial directions.

A position in which the rotor shaft 1 is levitated by the respective electromagnets is controlled in the following manner. The position of the rotor shaft 1 is detected by radial position sensors 5 to 8 placed at bilateral ends of the rotor shaft 1 and an axial position sensor 9 provided at one end of the rotor shaft 1. Detection signals of theses sensors are processed by a magnetic bearing controller H, and the exciting currents of the individual electromagnets are adjusted so that the rotor shaft 1 is held afloat in a reference target position.

Designated at 10 is a grinding stone (new wheel) to be dressed, which is detachably attached to the other end of the rotor shaft 1 and adapted to rotated with revolutions of the rotor shaft 1. More specifically, a motor 11 disposed substantially at the center of the rotor shaft is supplied with a driving current from the control means E, and the rotor shaft 1 acts to rotate as a rotor of the motor, thereby rotating the grinding stone 10 at a high speed.

The spindle a is movable by the grinding stone shaft table 12 in the axial directions (indicated by arrows Z in the Figure) of the rotor shaft 1. The grinding stone shaft table 12 mounted with the spindle a is movable by a servo motor 13 and a ball screw 14 rotated by this motor.

A head stock table b is mounted with a dresser head 36 equipped with a diamond dresser 35. The head stock table b is, as in the case of the spindle a, likewise movable by a moving mechanism. Namely, the head stock table b is movable by a servo motor 37 and a ball screw 38 rotated by this motor in directions (indicated by arrows X) orthogonal to the axial directions of the rotor shaft 1.

A contact position between the grinding stone 10 and the diamond dresser 35 is adjusted by moving the head stock table b and the grinding stone shaft table 12, thus determining a dressing undercut quantity and a dressing feed speed.

The control means E incorporates a magnetic bearing controller H for holding the rotor shaft 1 afloat in predetermined target position, a dressing controller K for judging a new wheel dress completion of the grinding stone 10, and a main controller G for controlling the above-mentioned controllers H and K en bloc.

The magnetic bearing controller H is comprised of:

a position detecting circuit 39 for detecting a levitating position of the rotor shaft 1 by processing detection signals transmitted from the respective position sensors 5-9 by use of a bridge circuit and other processing circuits;

a processing circuit 40 for adjusting the exciting currents of the electromagnets 2a-2d and 4a-4d to compensate a difference from the target position after comparing the detection signal transmitted from the position detecting circuit 39 with the reference target position; and an electromagnet driver 41 for supplying the exciting currents to the electromagnets 2a-2d and 4a-4d on the basis of signals outputted from the processing circuit 40. The dressing controller L, which is a characteristic component of the present invention, is comprised of:

an integration circuit 42 for integrating voltage values proportional to values of the exciting currents (control currents) of any one (the electromagnet 2a in this case) of the electromagnets of the electromagnet driver 41;

a peak hold circuit 43 for holding a peak value of the voltages proportional to the exciting current values;

a first multiplying circuit 44 for multiplying a hold value of the peak hold circuit 43 by a dress time $\Delta t$ obtained by dividing a l width (a grinding stone width in the direction of an arrow Z in the Figure) of the grinding stone 10 by a dressing feed velocity $V_D$ (a feed velocity in the direction of the arrow Z in the Figure);

a second multiplying circuit 45 for multiplying an output value of the first multiplying circuit 44 by a predetermined constant K (0.9 in the Figure);

a comparator 46 for comparing an output value of the integration circuit 42 with an output value of the second multiplying circuit 45; and a counter 47 for counting the number of outputs of the comparator 46 when the output value of the integration circuit 42 exceeds the output value of the second multiplying circuit 45.

The main controller G incorporating a programmable controller functions to control the above-mentioned controllers H and K. The main controller G also controls an inverter 48 for supplying a driving current to the motor 11 and also to servo motor drivers 49 and 50 for driving servo motors 13 and 37 for moving the grinding shaft table 12 and the head stock table b as well.

Figure 8:
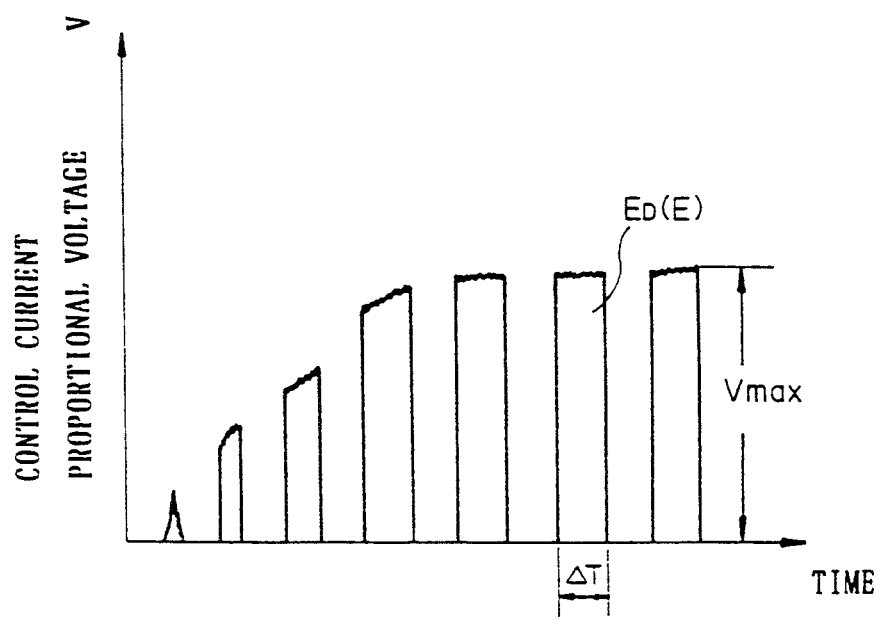
FIG. 8 is a diagram showing a state of voltages proportional to control currents.

Operations of the thus arranged third embodiment will be described with reference to FIGS. 8 and 9. FIG. 8 is a diagram showing a state of a voltage proportional to a second control current. FIG. 9 is a flowchart showing control operations.

A new wheel (grinding stone 10) is set to the rotor shaft 1, and the main controller G issues a magnetic bearing driving command to the magnetic bearing controller H. As a result, the exciting currents are fed to the electromagnets 2a-2d and 4a-4d, whereby the rotor shaft 1 is held afloat in a predetermined target position. At the same moment, a motor driving command is given to the inverter 48, thereby supplying a coil of the motor 11 with the exciting current. Then, the rotor shaft is rotatively driven (step 300).

The main controller G issues a driving command to the dressing controller K to preset therein a constant K (0.9) and a dress time $\Delta t$ obtained from a grinding stone width and a dressing feed velocity $V_D$ (step 301).

Next, a counter value of the counter 47 is reset and returns to 0 (step 302), and the diamond dresser 35 begins to move towards the grinding stone 10 (step 303). That is, the main controller G issues a driving command to the servo motor driver 49, with the result that the servo motor 37 is rotated to move the head stock table b in either (downwards in the Figure) of the directions indicated by arrows X. Subsequently, a driving command is imparted to the servo motor driver 43 to revolve the servo motor 13, as a result of which the grinding stone shaft table 12 moves in the Z-axis directions. Then, the grinding stone 10 touches the diamond dresser 35. At this time, however, the grinding stone 10 is in a deflective state at the early stage of movement, and hence it intermittently comes in contact therewith. A load is exerted on the rotor shaft 1 during this contactual period, thereby causing variations in the exciting currents of the respective electromagnets, i.e., in the control currents. These variations, as illustrated in FIG. 8, are small at the early state of movement because of a narrow contactual area and thereafter gradually become large.

Since voltages proportional to the control currents of the electromagnet 2a are inputted to the integration circuit 42 as well as to the peak hold circuit 43, the integration circuit 42 outputs an integrated value E (equivalent to an area of E in FIG. 8) obtained by integrating a voltage V proportional to the control current by a time $\Delta T$. Simultaneously, the peak hold circuit 43 outputs a maximum value $V_{MAX}$ at the time of the variations (step 304).

A virtual integrated value ED is calculated by multiplying $V_{MAX}$ by $\Delta T$ in the first multiplying circuit 44. As illustrated in FIG. 8, however, an upper end of the voltage V proportional to the control current is not flat but slightly undulated, because the rotor shaft 1 goes on revolving. For this reason, the second multiplying circuit 45 multiplies the virtual integrated value $E_D$ by the predetermined constant K (0.9 in this case), and $E_{D1}$ is thereby outputted (step 306).

The comparator 46 compares a reference output value E given from the integration circuit 42 with an output value $E_{D1}$ outputted from the second multiplying circuit 45. Based on this comparison, when the output value E is greater than $E_{D1}$ (step 308 Yes), the comparator 46 transmits output signals to the counter 47. Every time the output signals are transmitted, a count of the counter 47 is incremented by one (step 310).

Whereas if the output value E is smaller than $E_{D1}$ (step 308 No), the program returns to the step 302, wherein a counter value N is reset to 0.

When the count of the counter 47 comes to 3 or more (step 312 Yes), the counter 47 outputs signals to the main controller G, which in turn stops the drive of the servo motor drivers 49 and 50. In consequence of this, the servo motors 37 and 13 are stopped, thus completing new wheel dressing.

The reason why the counter value is set to 3 in the step 312 is that this numerical value is obtained from such an experimental result that the eccentricity (deflection) of the new wheel can be eliminated 100 percent. Hence, the counter value may be larger or smaller than this numerical value. If larger than this, however, the dressing quantity becomes unfavorably large. If the value is, e.g., 1, unfavorably the eccentricity will probably persist.

As discussed above, in this embodiment a contactual rate between the diamond dresser 35 and the grinding stone 10 is detected from variations in voltages proportional to the control currents of the magnetic bearing electromagnets of the rotor shaft 1, and the new wheel dress completion is thereby determined. It is therefore possible to minimize the dressing undercut quantity for eliminating the new wheel deflection.

As a result, it is feasible to prevent both over-dressing of the grinding stone and abrasions of the dresser. Besides, the dress period can be reduced.

Note that the voltage proportional to the control current of the electromagnet 2a is detected in the foregoing embodiment, but, as a matter of course, control currents of other electromagnets may also be used.

The present invention exhibits the following effects. As explained earlier, a rate of contact between the dresser and the grinding stone is detected from variations in voltages proportional to the control currents of the magnetic bearing electromagnets of the rotor shaft, thereby determining a total dressing undercut quantity. It is therefore possible to minimize the total dressing undercut quantity for eliminating the deflection of the new wheel.

This in turn prevents over-dressing of the grinding stone and abrasions of the dresser, thus increasing a life-span of the dresser. Furthermore, the dress time can be reduced.

What is claimed is:

1. A dressing control system, comprising: a plurality of electromagnets responsive to exciting currents to produce magnetic forces; a spindle having a rotor shaft magnetically supported by the magnetic forces; a grinding stone having a given width and being integral with the rotor shaft; dressing means for dressing the grinding stone; first moving means for moving the grinding stone at a feed velocity in a direction towards the dressing means; second moving means for moving the dressing towards the grinding stone; and controlling circuit means for controlling the first and the second moving means to accomplish dressing of the grinding stone, the controlling circuit means comprising means for applying exciting currents having corresponding voltages to the electromagnets, the voltages having respective voltage value variations due to undulations of the rotor shaft in response to contact between the grinding stone and the dressing means, detecting means for detecting the beginning stage of contact between the grinding stone and the dressing means dependent on the variations in the corresponding voltages, and dressing controlling means for determining when the dressing is completed dependent on the variations in the corresponding voltages of the exciting currents.

2. A dressing control system according to claim 1; wherein the dressing controlling means is cyclically operable and includes integrated means for integrating at least one of said respective voltage value variations over a predetermined period of time and generating a first output in response thereto, peak hold circuit means for holding a peak voltage of at least one of said corresponding voltages, multiplying means including a first multiplying circuit for multiplying the peak voltage by said predetermined period and generating a second output in response thereto, comparator means for comparing the first output with the second output and generating an output signal when the first output is greater than the second output, counting means for counting the output signal and generating a count number, and means for determining when the dressing is complete dependent on the count number.

3. A dressing control system according to claim 2; wherein the multiplying means includes a second multiplying circuit for multiplying an output of the first multiplying circuit by a predetermined constant whereby the second output is dependent on an output of the second multiplying means.

4. A dressing control system according to claim 2; wherein said predetermined time is a function of the width and the feed velocity.

* * * * *